United States Patent [19]

Botsch

[11] 3,780,998
[45] Dec. 25, 1973

[54] AERATING AND AGITATING DEVICE

[75] Inventor: Bertram Botsch, Karlsruhe, Germany

[73] Assignee: Maschinenfabrik H. Geiger, Karlsruhe, Germany

[22] Filed: Dec. 21, 1970

[21] Appl. No.: 100,304

[30] Foreign Application Priority Data
Dec. 20, 1969 Germany.................. P 19 64 308.4

[52] U.S. Cl. ............................................ 261/91
[51] Int. Cl. ........................................... B01f 7/16
[58] Field of Search................... 261/87, 91, 120; 210/242

[56] References Cited
UNITED STATES PATENTS

| | | |
|---|---|---|
| 2,063,301 | 12/1936 | Durdin, Jr. ............................ 261/91 |
| 2,072,944 | 3/1937 | Durdin III ............................ 261/91 |
| 2,120,786 | 6/1938 | Jordan .................................. 261/91 |
| 2,827,268 | 3/1958 | Staaf .................................... 261/91 |
| 2,928,661 | 3/1960 | MacLaren ............................ 261/87 |
| 3,235,233 | 2/1966 | Bolton .................................. 261/97 |
| 3,341,450 | 9/1967 | Ciabattari et al. .................. 261/91 |
| 3,462,132 | 8/1969 | Kaelin .................................. 261/91 |
| 3,521,864 | 7/1970 | Welles, Jr. ........................... 261/91 |
| 3,559,964 | 2/1971 | Kelsterbach ........................ 261/91 |

Primary Examiner—Tim R. Miles
Assistant Examiner—Steven H. Markowitz
Attorney—Ernest F. Marmorek, Jordan B. Bierman and Marmorek & Bierman

[57] ABSTRACT

An apparatus for the aeration and agitation of fluids including a vertically suspended pumping wheel submerged in the fluid and a turbine wheel having outlet openings above the fluid surface, the pumping wheel creating a flow directed to the turbine wheel.

17 Claims, 5 Drawing Figures

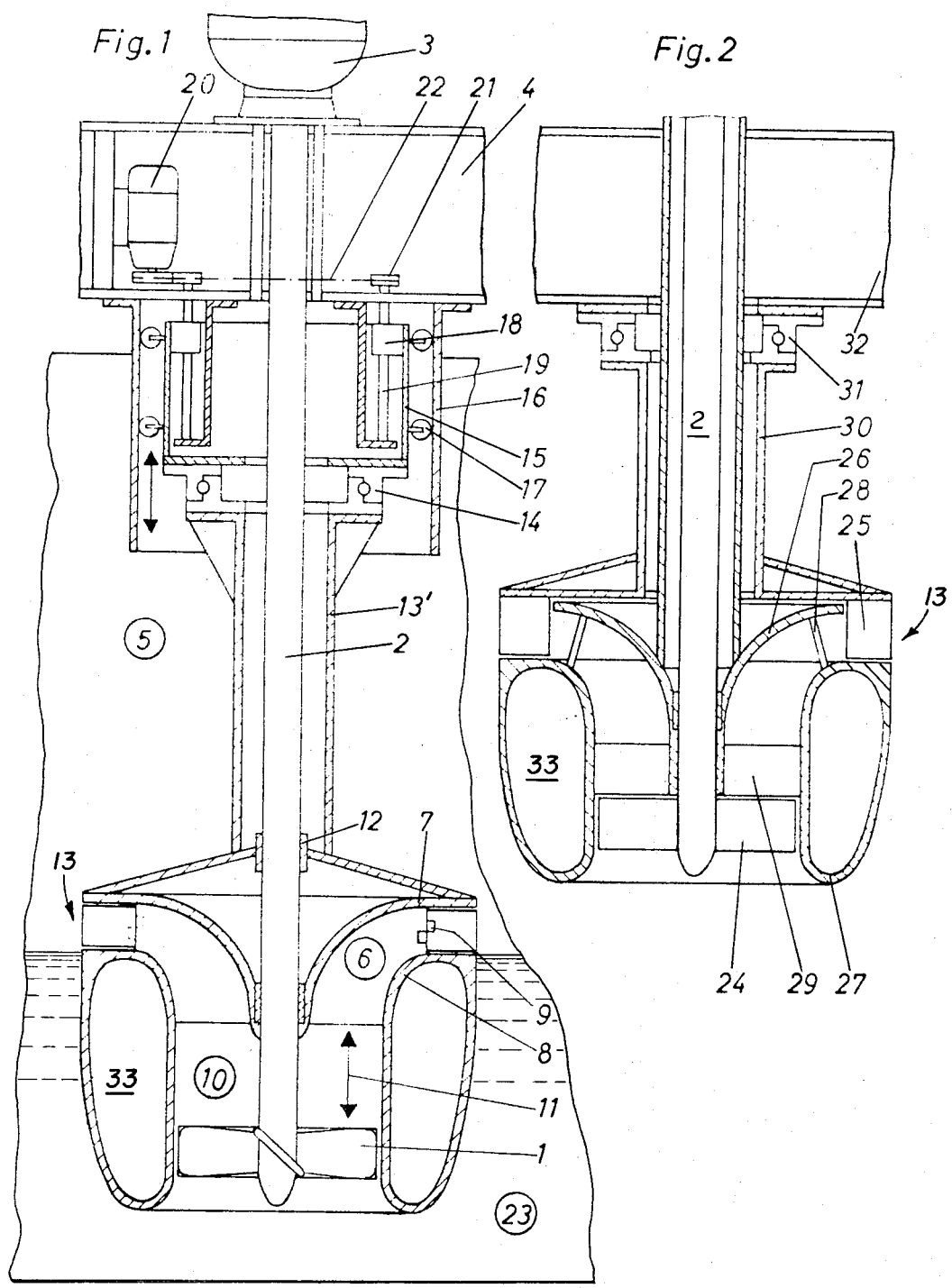

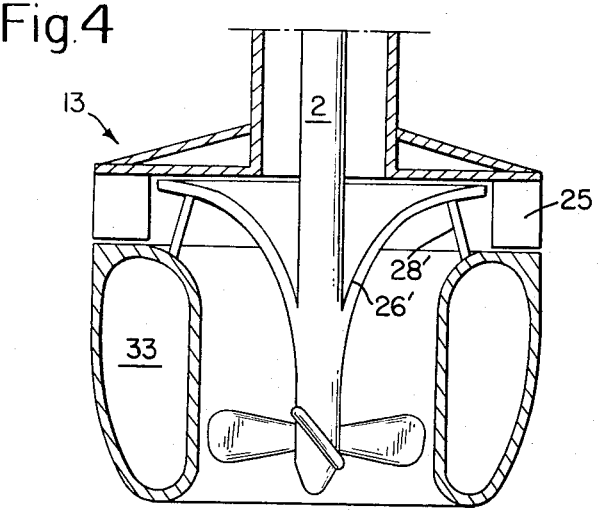
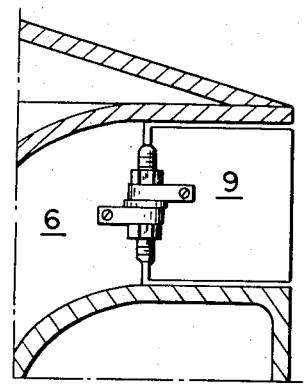
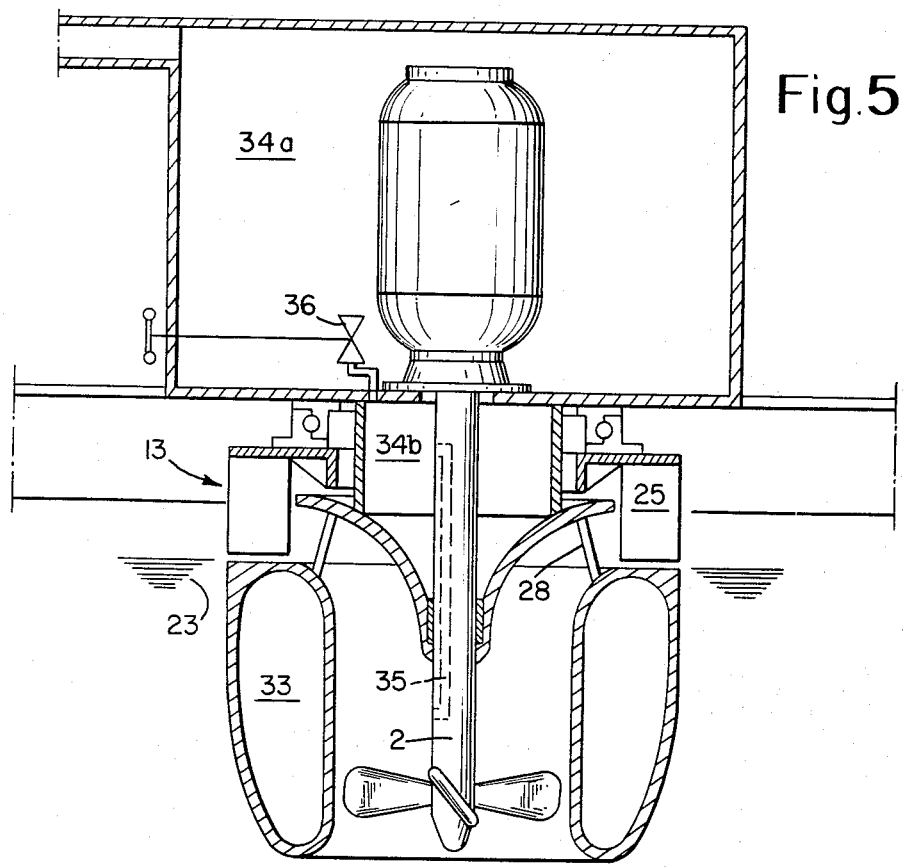

AERATING AND AGITATING DEVICE

FIELD OF THE INVENTION

The present invention relates to a device for the aeration and agitation or flotation of fluids, such as activated sludge in filter plants, which comprises a preferably axially disposed pumping wheel and a turbine wheel placed adjacent the surface of the fluid and having a vertical axis of rotation.

BACKGROUND OF THE INVENTION

Surface aerating devices attain a high aerating efficiency by the continuous and successively quick formation of a new surface of the fluid for the gas exchange. The agitation or flotation of the fluid at the same time takes care of the mixing and prevents in some cases of application, such as in the case of activated sludge filter plants, the sedimentation of solids.

There are pure agitation devices resting on the principle of propeller-agitator and also such which are provided with pumping wheels or so-called impeller wheels which are radially or half-radially flown through by the fluid and possess either partial-admission blades, full-flow ducts, or striker bars.

Furthermore, there are known aerating brushes having a horizontal axis or rotating discs which are partially submerged in the fluid.

One cannot leave out of consideration the aerating devices in which an additional aeration of the fluid is provided by means of inserting a gas under pressure within the aerating device itself.

All of the above-mentioned devices possess a disadvantage in that the agitation and the flotation of the fluid as well as the desirable insertion of the gas into the fluid is performed by a single device.

In an attempt to meet the requirement of the aeration or gas insertion into the fluid so far extreme care has been given to the construction of purely gas insertion elements, while necessarily the requirement to create a good flow has been given lesser attention. A study of the problem in question shows that in order to sustain a good flow only a fraction of the electrical power which has been provided in the known devices is used.

When considering the pure flow problems, an expert in the pumping art can safely say that with the known flow devices no optimum pumping efficiency can be attained. The volume of the flow and the slight delivery height require an axial pumping wheel and, in a given case, a pumping wheel having a carefully selected guiding arrangement as well as inlet and outlet means.

An aerating device became known in which an axial pumping wheel operates upon a spray nozzle which sprays the fluid into a gas space. This device is especially adaptable in drinking water apparatus or other fluid devices which operate on fluid which has been preliminarily cleaned. The flow conditions to the pump and especially the spraying device are, however, so constructed that the load efficiency of the aeration cannot be optimum.

Furthermore, from German Pat. No. 934,043 a mixer for the mixing of gases and fluids is known according to which the fluid which is to be aerated is sprayed by means of a pair of coupled but oppositely operating screw-type shovellers over the surface of the fluid body and by means of the second screw-type shoveller it becomes directly sucked off from the upper surface and guided back into the lower regions of the fluid volume. In this mixer the fluid pumped into the upper surface falls back onto the surface of the fluid in a bell-shape manner from a central guide member. The aerating of gas insertion efficiency of such devices is however excelled by the impeller in which the fluid bell is split up into individual sprays and/or in which such sprays perform themselves a rotating movement about the vertical axis.

SUMMARY OF THE INVENTION

It is, therefore, an object of the present invention to provide a device for the aeration and agitation of fluids in which the aeration and the agitation of the fluids are separated into two functions and each is performed by a device operating on its own with optimum efficiency.

According to the present invention the fluid is mixed by a pump which operates in the optimum region of its efficiency and it becomes distributed over the fluid surface by a turbine wheel having a vertical axis and approximately radial channels.

According to the present invention, in the preferred embodiment, a pump having an axial pumping wheel which, for example, is constructed in an optimum fashion by a Cordier-diagram.

BRIEF DESCRIPTION OF THE DRAWINGS

The invention will become more readily apparent from the following description of preferred embodiments thereof shown in the accompanying drawings, in which:

FIGS. 1, 2, 4 and 5 illustrate each an embodiment, according to the present invention, in vertical sections;

FIG. 3 is an enlarged view partly in section of adjusting element on the turbine wheel.

DESCRIPTION OF THE PREFERRED EMBODIMENTS

The embodiment shown in FIG. 1 comprises an axial pumping wheel 1 which by means of a drive shaft 2 is coupled with a driving motor 3 placed on a bridge 4 which spans the fluid pool 5 with the fluid 23 in it. In the turbine wheel 13 designed on the principle of a hydraulic reaction wheel (the so-called "Segner wheel") the initially vertical walls 6 divide the annular space formed between the upper portion 7 and the lower portion 8 into approximately radial channels the angle of pitch of which with respect to the radius can be selected and set by adjusting elements 9 as shown in greater detail in FIG. 3. The lower member 8 of the turbine forms simultaneously a suction conduit 10 for the pumping wheel 1. The length of the suction conduit 10 when a turbine with hoist is used, is determined by the relative motion 11 between the pump and the turbine by the length of the hoist. The turbine upper portion 7 is supported by a journaling member 12 with respect to the driving shaft 2. The turbine itself is secured by means of a connecting conduit 13' and by means of a rotating coupling 14 to the bridge 4 or to the hoisting arrangement in a rotatable fashion. The hoisting unit can, for example, include an inner 15 and an outer 16 supporting ring which are movable with respect to each other over rolling or sliding supporting elements 17. The inner supporting ring 15 is supported on the bridge 4 by continuation of a spindle nut 18 and a spindle 19. By means of a common drive, such as hoist motor 20, sprocket wheel 21 and a chain 22 or similar elements, the inner supporting element 15 and thereby the turbine can be hoisted up or lowered by the action of the spindle 19 and unit 18 combination when driven by the sprocket wheel 21.

With reference to FIG. 2 it is seen that between the axial pumping wheel 24 and between the radial turbine wheel 25 a guide member having an upper element 26 and a lower element 27 connected by means of webs 28, is placed. The guide member forms in this embodiment the housing for the pumping wheel 24 and, at the same time, it serves also as the housing for a guide arrangement 29 if such is present. The turbine wheel 25 is again secured to the bridge 32 by means of a connecting tube 30 and a rotating coupling arrangement 31.

With respect to the known impeller arrangement the pump and turbine combination of the present invention shows a superior efficiency at lower operating and manufacturing costs.

The known impellers operate, depending from their size and load requirements, on the average at 40–100 rpm. The drive between the motor and the impeller usually includes two or more gear stages and takes up about 40–70 percent of the entire manufacturing cost. According to the present invention, the pumping wheel is operated directly in proportion with the rpm of the driving motor 3 or through not more than a single stage gear so that the gear between the motor 3 and the pumping wheel 1 can be either entirely omitted or at least the second and third gear stages can be omitted.

The element which eventually takes care of the aerating function according to the present invention is the turbine wheel the number of revolutions of which is not determined by a motor or by some mechanical means but only by hydraulic considerations. By choosing an appropriate setting of the pitch angles between the approximately vertical channel walls and between the radius at the regions of the circumference, any desired number of revolutions can be attained, even a number of revolutions which are common with impeller wheels.

In a special form of the turbine of the present invention, the approximately vertical channel walls can on their outer end portions be made movable so that the setting of the pitch angle in certain conditions can be adjusted to the given operating conditions by adjusting elements 9.

Many times in practical applications there arises the necessity to adjust the height of the aerating device. For this reason, the entire aerating device can be hoisted upward or lowered by means of a hoisting arrangement or by an axially slidable special drive. According to the present invention the pump 1 remains on the same level and only the turbine wheel, which in some embodiments at the same time forms the inlet and outlet openings of the pump housing, requires an adjustment in height. As a result, the hoisting arrangement becomes substantially lighter and less costlier to make than in the known arrangements.

In a further embodiment the above-mentioned special guide member 26, 27 is arranged before the turbine wheel for guiding the fluid 23 flowing axially from the pump 1 in such a fashion that the fluid hits the turbine approximately in a radial direction. The guide member may either remain stationary or, in some embodiment, may run together with the pumping wheel 1 or with the turbine wheel. In a preferred embodiment, as mentioned above, it can form the housing for the pumping wheel 1.

The detailed hoisting arrangement can also have different structural forms and it can operate either on the guide member 26, 27 or on the turbine wheel or on both together.

On the guide member 26, 27, in addition, a stationary bucket-like further guide arrangement can be provided to further improve the efficiency, and under some conditions, it may be arranged in such close proximity to the pumping wheel that a shearing process should take place between the bucket of the guide arrangement and between the pumping wheel 1 in the event the fluid contains any fiber-like components. Under these conditions the opposing edges of the bucket crown can be provided with a cutting edge.

In case of impellers in some applications, especially in filter plants, a critical magnitude is assigned to the flow velocity under the influence of which the floccule of the activated sludge becomes destroyed. For this reason, in activated sludge plants certain limiting velocities cannot be exceeded. In the aerating arrangement, according to the present invention, the revolution of the pump wheel 1 and of the turbine wheel can be made equal and set to remain under magnitude of the critical velocity.

In a further advantageous embodiment, the aerating arrangement according to the present invention can also be employed to measure the exact values of the critical limiting velocities or to study the different effects of it on the aerating process within the complex process of the simultaneous agitation or flotation and surface stirring, which effects and velocities have not been subjected to a great deal of research up to now. By selecting a certain operating point for the pumping process and a variable operating condition for the aerating process the actual optimum efficiency of the aerating unit can be determined.

In a preferred embodiment the lower portion of the pump housing is formed in an annular hollow body 33. Such construction creates a favorable flow guide for the fluid being in constant movement about the outer side of the pump and thereby reduces the whirling and flow losses. The torus shaped hollow body 33 can be made preferably as big that it can serve as a floater for the entire arrangement shown in FIGS. 1 and 2.

In a preferred embodiment as shown in FIG. 5 an additional and systematic aerating device is preferably provided in the form of conduits 34b, 35 opening into the region or onto the pumping wheel itself. The gas can be introduced by self-flow due to the effect of the underpressure in the pumping system or by means of an excess pressure in an outside gas space 34a. By regulating the gas stream by a control device 36 one may advantageously vary the amount of gas added and the specific gas insertion efficiency. As a result, the device according to the present invention becomes more adaptable to the varying conditions existing especially in systems using other than a constant gas insertion, such as in the restoring apparatus of classification plants.

The use of an axial pump as proposed by the present invention has the special advantage that the flow direction depends from the direction of rotation of the pumping wheel. If the device according to the present invention is used in fluids which contain solids or fibers, then a clogging which might take place can be eliminated by the simple reversal of the flow direction and thereby returning the device to its fully operational state. This is not possible with impellers having radial or half-radial pumping wheels since any clogging in them requires mechanical cleaning, that is, complete stoppage of the operation. It might become even necessary to lower the fluid level or completely dismantle the pump in contrast to the device according to the present invention where cloggings are removed by a simple hydraulic operation.

According to the present invention a method and apparatus are proposed for the aeration and agitation of fluids wherein the number of revolutions of the pump and of the turbine are so adjusted that an optimum efficiency is attained as well for the pump as for the insertion of the gas by the turbine.

I wish it to be understood that I do not desire to be limited to the exact details of construction shown and described, for obvious modifications will occur to a person skilled in the art.

Having thus described the invention, what I claim as new and desire to be secured by Letters Patent, is as follows.

1. An apparatus for the aeration and agitation of a body of fluid defining a surface level,
   comprising in combination
   a pumping device immersible into said fluid and including an upright conduit for delivering a stream of fluid above said surface level,
   a reaction turbine wheel suspended above said surface level and for rotation about an upright axis and having a plurality of radial channels communicating with said conduit, and
   fluid guiding means communicating with said conduit and receiving said stream from the conduit and diverting and distributing said stream towards said radial channels for imparting a hydraulic reaction movement to said turbine wheel.

2. The apparatus as claimed in claim 1, wherein said radial channels have substantially vertical walls, and means are provided for adjusting the setting angle between the portions of the walls of said channels at the region of the circumference of said turbine wheel and the remaining wall portions.

3. The apparatus as claimed in claim 1, wherein means are provided for adjusting the position of said turbine wheel along said axis.

4. The apparatus as claimed in claim 1, wherein said turbine wheel is a hydraulic reaction wheel.

5. The apparatus as claimed in claim 1, said pumping device having an axial pumping wheel in said conduit and means for adjusting the delivery capacity of said pumping device.

6. The apparatus as claimed in claim 5, further comprising a housing for said pumping wheel, said housing being formed as an annular float means.

7. The apparatus as claimed in claim 5, further comprising a driving shaft for said pumping wheel, a plurality of conduits connected to a gas container means above said fluid surface, said conduits opening in the region of said pumping wheel below said fluid surface, said conduits delivering gas into said fluid body, and means for regulating the quantity of said gas flowing into said fluid.

8. The apparatus as claimed in claim 7, wherein said conduits are formed in said shaft.

9. The apparatus as claimed in claim 5, wherein the direction of rotation of said pumping wheel is reversible.

10. The apparatus as claimed in claim 5, wherein said conduit of said pumping wheel is connected to and rotatable with said turbine wheel.

11. The apparatus as claimed in claim 5, said guiding means including a guide member positioned between the axial pumping wheel and the radial turbine wheel, said guide member being shaped for providing an axial in-flow and a radial out-flow therethrough.

12. The apparatus as claimed in claim 11, wherein said guide member is coupled for rotation with said turbine wheel.

13. The apparatus as claimed in claim 11, wherein said guide member is coupled for rotation with said pumping wheel.

14. The apparatus as claimed in claim 11, wherein said guide member is provided with bucket means.

15. The apparatus as claimed in claim 11, wherein said guide member is secured to said conduit.

16. The apparatus as claimed in claim 11, wherein a further guide means is provided on said guide member.

17. The apparatus as claimed in claim 11, wherein means are provided for adjusting said guide member along said axis.

* * * * *